(12) United States Patent
Moss

(10) Patent No.: US 10,270,586 B2
(45) Date of Patent: Apr. 23, 2019

(54) RANDOM TIME GENERATED INTERRUPTS IN A CRYPTOGRAPHIC HARDWARE PIPELINE CIRCUIT

(71) Applicant: Seagate Technology, LLC, Cupertino (CA)

(72) Inventor: Robert W. Moss, Windsor, CO (US)

(73) Assignee: Seagate Technology LLC, Cupertino, CA (US)

( * ) Notice: Subject to any disclaimer, the term of this patent is extended or adjusted under 35 U.S.C. 154(b) by 177 days.

(21) Appl. No.: 15/496,060

(22) Filed: Apr. 25, 2017

(65) Prior Publication Data
US 2018/0307864 A1 Oct. 25, 2018

(51) Int. Cl.
G06F 7/58 (2006.01)
H04L 9/00 (2006.01)
H04L 9/08 (2006.01)
G06F 21/75 (2013.01)
H04L 29/06 (2006.01)

(52) U.S. Cl.
CPC ............ *H04L 9/003* (2013.01); *G06F 21/755* (2017.08); *H04L 9/0861* (2013.01); *H04L 63/1441* (2013.01); *G06F 7/588* (2013.01); *G06F 2207/7223* (2013.01); *G06F 2212/402* (2013.01); *H04L 2209/08* (2013.01); *H04L 2209/125* (2013.01)

(58) Field of Classification Search
CPC ... H04L 9/003; H04L 9/0861; H04L 63/1441; H04L 2209/08; H04L 2209/125; G06F 21/755; G06F 7/588; G06F 2207/7223; G06F 2212/402
See application file for complete search history.

(56) References Cited

U.S. PATENT DOCUMENTS

| | | |
|---|---|---|
| 5,231,636 A | 7/1993 | Rasmussen |
| 6,654,884 B2 | 11/2003 | Jaffe et al. |
| 6,748,535 B1 | 6/2004 | Ryan, Jr. et al. |
| 6,807,232 B2 | 10/2004 | Nicholson et al. |
| 7,417,468 B2 | 8/2008 | Verbauwhede et al. |
| 7,426,629 B2 | 9/2008 | Piry et al. |
| 7,599,488 B2 | 10/2009 | Kocher et al. |

(Continued)

OTHER PUBLICATIONS

Xavier Charvet and Herve Pelletier, Improving the DPA Attack Using Wavelet Transform, pp. 1-15.

*Primary Examiner* — Techane Gergiso
(74) *Attorney, Agent, or Firm* — Hall Estill Attorneys at Law

(57) ABSTRACT

Apparatus and method for defending against a side-channel information attack such as a differential power analysis (DPA) attack. In some embodiments, a cryptographic hardware pipeline circuit performs a selected cryptographic function upon a selected set of data over a processing time interval. The pipeline circuit has a sequence of stages connected in series. The stages are enabled responsive to application of an asserted enable signal. An enable interrupt circuit is configured to periodically interrupt the selected cryptographic function to provide a plurality of processing intervals interspersed with the interrupt intervals. At least a selected one of the processing intervals or the interrupt intervals have random durations selected responsive to a series of random numbers.

20 Claims, 6 Drawing Sheets

(56) References Cited

U.S. PATENT DOCUMENTS

| | | | |
|---|---|---|---|
| 7,603,549 B1* | 10/2009 | Kay | H04L 63/0485 |
| | | | 713/153 |
| 7,639,058 B2 | 12/2009 | Kuroawa et al. | |
| 7,870,336 B2 | 1/2011 | Erlingsson et al. | |
| 8,334,705 B1 | 12/2012 | Gunnam et al. | |
| 8,427,194 B2 | 4/2013 | Deas et al. | |
| 8,635,467 B2 | 1/2014 | Gunnam et al. | |
| 8,879,724 B2 | 11/2014 | Kocher et al. | |
| 9,250,671 B2 | 2/2016 | Tucker | |
| 9,343,162 B2 | 5/2016 | Tasher et al. | |
| 9,436,603 B1 | 9/2016 | Pohlack | |
| 9,594,928 B1* | 3/2017 | Langhammer | G06F 21/72 |
| 2005/0144468 A1* | 6/2005 | Northcutt | G06F 21/10 |
| | | | 713/189 |
| 2007/0110053 A1* | 5/2007 | Soni | H04L 63/0263 |
| | | | 370/389 |
| 2009/0013224 A1* | 1/2009 | Ziaja | G06F 11/2236 |
| | | | 714/724 |
| 2009/0060197 A1* | 3/2009 | Taylor | H04L 9/0618 |
| | | | 380/277 |
| 2010/0332909 A1* | 12/2010 | Larson | G06F 11/3476 |
| | | | 714/40 |
| 2011/0260749 A1 | 10/2011 | Deas et al. | |
| 2012/0204056 A1 | 8/2012 | Airaud et al. | |
| 2013/0007881 A1 | 1/2013 | Liem et al. | |
| 2014/0075147 A1* | 3/2014 | Stark | G06F 9/467 |
| | | | 711/205 |
| 2015/0082434 A1 | 3/2015 | Sethumadhavan et al. | |
| 2015/0365228 A1 | 12/2015 | Belenky | |
| 2017/0177870 A1* | 6/2017 | Hildebrand | G06F 9/4418 |

* cited by examiner

RANDOM TIME GENERATED INTERRUPTS IN A CRYPTOGRAPHIC HARDWARE PIPELINE CIRCUIT

SUMMARY

Various embodiments of the present disclosure are generally directed to defending against a side-channel information attack, such as a differential power analysis (DPA) attack, through the use of random time generated interrupts.

In some embodiments, a cryptographic hardware pipeline circuit performs a selected cryptographic function upon a selected set of data over a processing time interval. The pipeline circuit has a sequence of stages connected in series. The stages are enabled responsive to application of an asserted enable signal.

An enable interrupt circuit is configured to periodically interrupt the selected cryptographic function to provide a plurality of processing intervals interspersed with the interrupt intervals. At least a selected one of the processing intervals or the interrupt intervals have random durations selected responsive to a series of random numbers.

These and other features which characterize various embodiments of the present disclosure can be understood in view of the following detailed discussion and the accompanying drawings.

DETAILED DESCRIPTION

Figure 1:
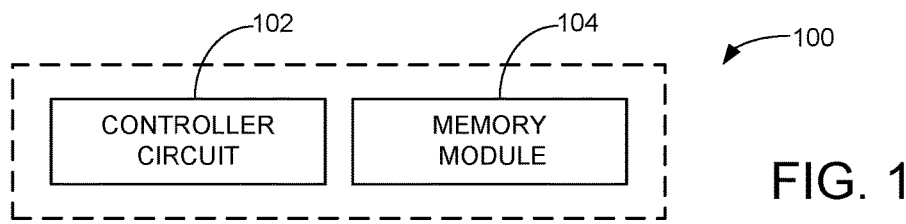
FIG. 1 is a functional block representation of a data storage system which operates in accordance with various embodiments of the present disclosure.

The present application is generally directed to data management in a communication channel, and more particularly to a method and apparatus for defending against a side-channel attack upon a data processing device, including but not limited to a differential power analysis (DPA) attack.

Data security schemes are used to reduce or eliminate unwanted access to data by unauthorized users of digital data processing systems. Data security schemes can employ a variety of security techniques in an effort to protect data. Some data security schemes employ cryptographic processes whereby data are processed, or encrypted, using a selected cryptographic algorithm to encode data in such a way that the underlying data cannot be easily recovered by an attacker. A wide variety of cryptographic functions are known in the art.

Cryptographic systems are generally operable to protect the underlying data from discovery. Even so, so-called side-channel attacks are often used by motivated attackers to glean side channels, or separate information streams, from a system that can ultimately reveal important information about the system, up to and including decoding of the data protected by the cryptographic algorithm. Side-channel attacks can take a variety of forms.

One common example of a side-channel attack involves monitoring a video channel of compressed data from a video source over time. If a camera or other data collection device captures video frames of a particular viewpoint and compresses the video data prior to transmission, the monitoring of a video stream of such data can indicate the presence (or absence) of a significant change in the viewpoint accessed by the camera. This is based on the recognition that highly compressed video data schemes tend to transmit successive frames of data with only the differences that were detected from one frame to the next.

If no significant changes have been detected in the field of view, the amount of transmitted data (and correspondingly, the amount of power or data packet size) should remain at a relatively low and constant value. On the other hand, a sudden increase in the amount of data transmitted would tend to indicate a significant change in the field of view has taken place, even if the underlying content of the visual content remained encrypted and undiscoverable.

Another well-known side-channel attack is sometimes referred to as a differential power analysis (DPA) attack. In a DPA context, an attacking party monitors differences in power consumption by an integrated circuit (IC) configured to carry out cryptographic functions. By comparing the power consumed by the IC in response to different input values, over time the attacker may be able to correlate certain inputs to different power consumption outputs.

Given enough time, the attacker may be able to discern, from the information leaking from this side-channel path, the underlying cryptographic function that is being employed to encrypt the data, various encryption keys that are being used, and so on. Even if the underlying data cannot be retrieved, DPA attacks can still provide valuable information to an attacker regarding the construction and operation of the system.

For reference, the term differential power analysis (DPA) applies to attacks that evaluate power consumption fluctuations as well as other forms of emission or consumption, such as electromagnetic radiation, heat, etc. A DPA attack may be invasive or non-invasive and, depending on the configuration, may be able to sense internal operations within a sealed enclosure such as an integrated circuit package, etc. without physically connecting to the device.

Accordingly, various embodiments of the present disclosure are generally directed to a method and apparatus for configuring a processing device such as a data storage device to defeat or otherwise inhibit the effectiveness of a side-channel informational attack carried out upon the device, including but not limited to a differential power analysis (DPA) attack.

As explained below, some embodiments generally involve configuring a cryptographic hardware pipeline to perform a selected cryptographic function upon input data. The cryptographic hardware pipeline comprises a plurality of serially connected stages each having an input terminal and an output terminal, where the input terminal of each successive stage in the pipeline is connected to the output terminal of each immediately previous stage.

Each stage includes a logic circuit to carry out a combinatorial logic operation and a register to store data. Each stage is enabled via a system enable signal from a control circuit to initiate the cryptographic function. A system clock signal is supplied to each stage to clock the combinatorial logic operations and to advance the data through the pipeline over a processing time interval.

An enable interrupt circuit operates during a protection mode to periodically interrupt the cryptographic processing by the pipeline over the processing time interval. The interrupts disrupt the starting and ending points of the cryptographic function, as well as the power consumed by the pipeline during the execution of the cryptographic function, thereby increasing the difficulty of discerning the underlying cryptographic function during a side-channel attack.

These and other features and advantages of various embodiments can be understood beginning with a review of FIG. 1 which provides a generalized functional block diagram of a processing device characterized as a data storage device 100. The data storage device 100 includes a controller circuit 102 and a memory module 104. The controller circuit 102 is a hardware-based or programmable processor that provides top level control of the device 100. The memory module 104 comprises non-volatile memory such as but not limited to rotatable memory and/or solid-state memory.

The data storage device 100 can take any number of forms including a hard disc drive (HDD), a solid-state drive (SSD), a hybrid drive, an optical drive, a thumb drive, a memory card, integrated memory within an electronic device such as a computer, tablet, smart phone, appliance, work station, server, etc. The controller functionality can be incorporated directly into the memory module as desired.

Figure 2:
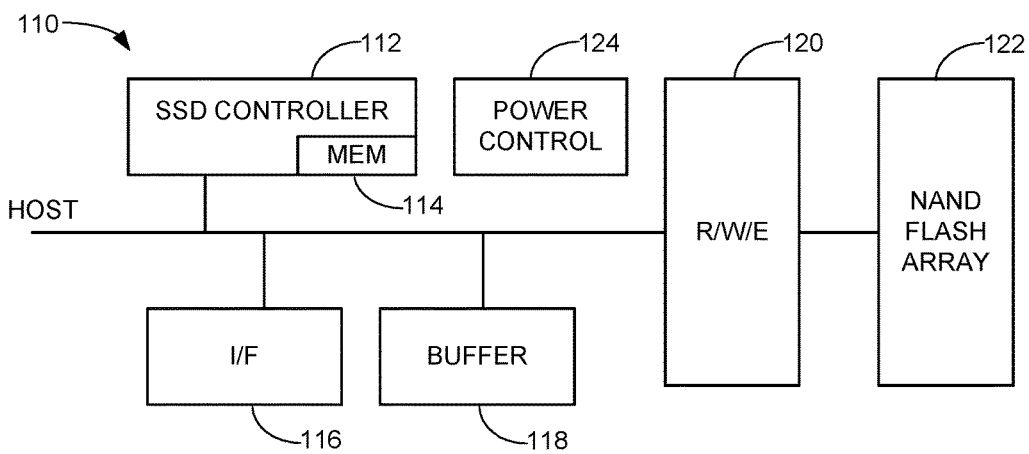
FIG. 2 shows a data storage device as in FIG. 1 configured as a solid state drive (SSD) with solid-state non-volatile NAND flash memory cells to store data in accordance with some embodiments.

FIG. 2 depicts aspects of a data storage device 110 generally similar to the data storage device 100 of FIG. 1. The device 110 is characterized as a solid state drive (SSD), although this is merely for purposes of illustration and is not limiting.

An SSD controller 112 generally corresponds to the controller circuit 102 of FIG. 1 and may be realized as a hardware circuit and/or a programmable processor with associated programming stored in local SSD controller memory (MEM) 114. An interface (I/F) circuit 116 coordinates transfers of commands and data between the SSD 110 and a host device. A buffer memory 118 may constitute volatile local buffer memory such as DRAM and/or SRAM to temporarily store user data during data transfer operations.

A read/write/erase (R/W/E) circuit 120 has the requisite functionality to carry out read, write (programming) and erasure functions upon a NAND flash memory array 122. The R/W/E circuit 120 and NAND flash memory array 124 may be incorporated in the memory module 104 of FIG. 1. The memory array 122 may include two dimensional (2D) or three dimensional (3D) NAND flash memory cells. The memory array 122 may further comprise individual flash memory cells configured as single level cells (SLCs), multi-level cells (MLCs), three-level cells (TLCs), etc.

During host write operations, input host user data will be received from a host device and placed in the buffer memory 118. Encryption circuitry of the SSD 110 will encrypt the data to form encrypted user data which are stored in the NAND flash array 122. During host read operations, the previously encrypted user data will be read from the NAND flash array 122, decrypted, and placed in the buffer 118 pending transfer to the host device.

A power control circuit block is denoted at 124. The power control circuit block 124 is operative to supply appropriate rail voltages (e.g., 3.3V, etc.) to the various circuits of the SSD 110 during powered operation. The power control circuit block 124 may receive input power from an external source, such as through the host interface, or may operate to convert input power from a locally supplied source such as battery power, an external AC power source, etc.

Figure 3:
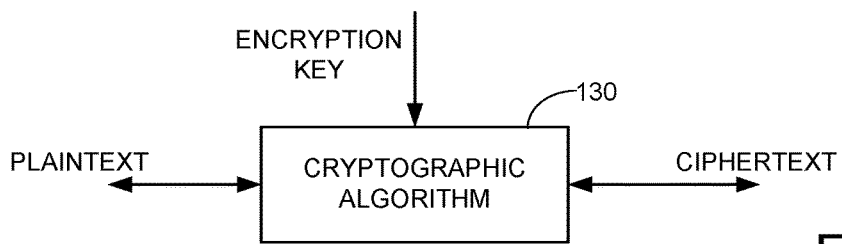
FIG. 3 shows a cryptographic algorithm block configured to carry out a cryptographic function upon input plaintext to form output cyphertext in some embodiments.

FIG. 3 shows a cryptographic algorithm block 130 of the SSD 110. As explained below in greater detail, the cryptographic algorithm block 130 is realized in hardware and includes one or more cryptographic hardware pipeline circuits to perform high speed cryptographic functions. The block 130 may be realized as a portion of the SSD controller 112, the R/W/E channel 120, or some other portion of the SSD 110.

The block 130 generally operates to transform input data (e.g., plaintext) into output data (e.g., ciphertext). This transformation is carried out using a selected cryptographic transform in accordance with one or more input parameters, such as an encryption key. Other input parameters can be used such as seed values, counter values, data addresses, etc. The plaintext data represented in FIG. 3 may be in the form of unencrypted data, or may be data that have been previously encrypted by an upstream encryption process. The process is symmetric so that previously encrypted data (e.g., converted from plaintext to ciphertext) may be decrypted to return the original data (e.g., converted from ciphertext to plaintext).

A cryptographic function as defined herein is a function that is configured to increase the entropy of an input set of data toward the purpose of enhancing data security. Substantially any cryptographic function can be used by the block 130 to transform the input plaintext data to provide the output ciphertext data, including but not limited to AES algorithms, hash functions, public/private key encryption algorithms, cipher block chaining (CBC) encryption algorithms, XTS mode (XOR/Encrypt/XOR based encryption with ciphertext stealing algorithms, etc.

Figure 4:
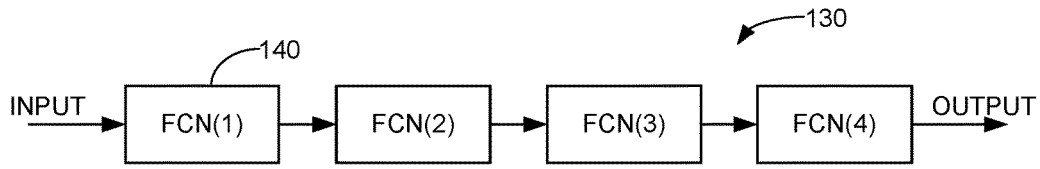
FIG. 4 shows a sequence of cryptographic functions that may be carried out in succession to effect the cryptographic algorithm of FIG. 3.

FIG. 4 shows a simplified functional block representation of the operation of the cryptographic algorithm block 130 of FIG. 3, broken up into a sequence of individual function blocks 140 that represent a series of combinatorial functions (FCN(1) to FCN(4)) that are successively carried out to perform the overall function of block 130. It will be appreciated that the specific number and type of functions will depend upon the form of the underlying cryptographic algorithm of block 130. Nevertheless, from FIG. 4 it can be seen that, for a given cryptographic algorithm, there will be a defined sequence of operations (e.g., addition, multiplication, data shifts, etc.) that are sequentially employed to generate the output ciphertext irrespective of the value of the input plaintext.

This functional arrangement of the operation of block 130 is necessary to ensure that, whatever sequence of transformations have been applied to a given set of input data, such operations are both repeatable and reversible. A cryptographic function needs to be repeatable in such a way that, for a given input value (plaintext), the same output value (ciphertext) is produced each time, or is otherwise obtainable from the output value. A cryptographic function needs to be reversible in such a way that, for a given set of encrypted ciphertext, the originally presented input data can be extracted and returned.

It follows that substantially all cryptographic algorithms may be susceptible to one or more types of side-channel attacks to detect information that leaks from the system. This is true even if steps are taken to protect the particular sequence carried out by the cryptographic algorithm, as well as the various inputs (e.g., encryption keys, seed values, etc.). Of particular interest to the present discussion are differential power analysis (DPA) attacks, which can be used to disclose important information to an attacker which, in some cases, may enable the attacker to not only discern the type of encryption used, but can also reveal particular state values as well such as the individual encryption keys, seed values, etc. that were used in the encryption process. The various techniques disclosed herein, however, are suitable to protect against other forms of side-channel attacks as well.

Figure 5:
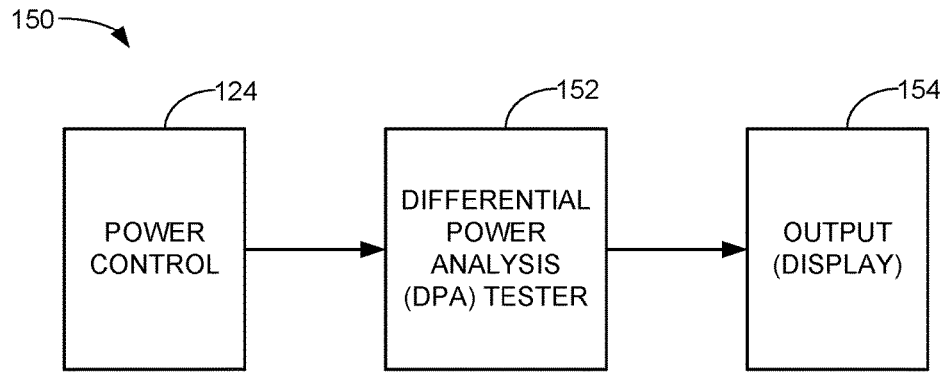
FIG. 5 is a functional block diagram of a system configured to carry out a differential power analysis (DPA) attack upon the data storage device of FIG. 2.

FIG. 5 shows an evaluation system 150 used by an attacker to obtain information regarding the cryptographic algorithm utilized by block 130 in FIG. 3. It is presumed that the attacker has obtained physical custody and control of the SSD 110 and can access various circuits of the device, including the power control circuit block 124 of FIG. 2.

A differential power analysis (DPA) tester device 152 accesses the power control circuit block to observe the power drawn by the SSD 110 or individual circuits thereof (e.g., the SSD controller 112) during operation. In at least some cases, the tester device 152 operates as particular inputs are supplied to the cryptographic algorithm block 130. Even if the tester 152 merely observes operation of the device 110 without being able to expressly enforce certain inputs, valuable information can still be collected over time with regard to the operation of the circuit. This output information can be collected by an output device 154, which may include a visual display feature (e.g., a computer monitor, etc.).

Figure 6:
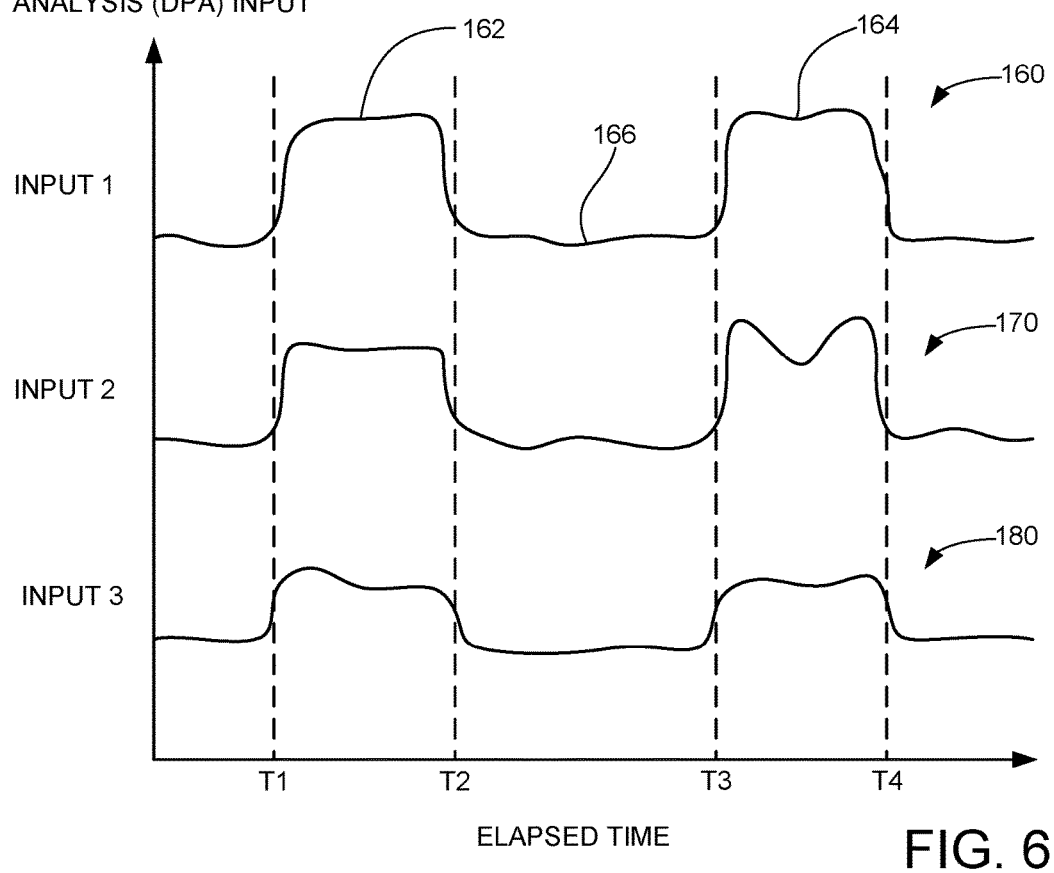
FIG. 6 is a graphical representation of exemplary data that may be recovered using the DPA attack equipment of FIG. 5 in some embodiments.

FIG. 6 is a simplified DPA analysis diagram showing various DPA response curves 160, 170 and 180 that are obtained by the system 150 of FIG. 5. It will be appreciated that other forms of DPA data may be recovered, and that the waveforms are highly simplified (e.g., filtered) to facilitate the present discussion. Each of the respective curves 160, 170 and 180 capture power levels drawn by a selected circuit (e.g., the SSD controller 112) over a selected period of time for different inputs. It is contemplated that the waveforms show operation of the circuit to carry out the cryptographic algorithm of block 130 of FIG. 3.

As shown by the respective curves, there are periods of high power consumption, such as depicted by pulses 162 and 164 in curve 160, and periods of low power consumption, such as depicted by region 166 in curve 160. Curve 170 and 180 have similar features although of different magnitudes. Each of these respective areas roughly correlate in time with different starting and ending periods indicated by time indicies T1-T4.

Given sufficient time, resolution and input variability, a motivated attacking party may be able to discern, from these and similar waveforms, the underlying processing carried out by the circuit. For example, certain types of operations, such as multiplication, involving logical 1s may require more current draw than the same operations involving logical 0s. Even if the attacking party is not able to fully "break" the encryption code in use, valuable information can be gleaned from the ability to correlate the circuit response based on different inputs.

Figure 7:
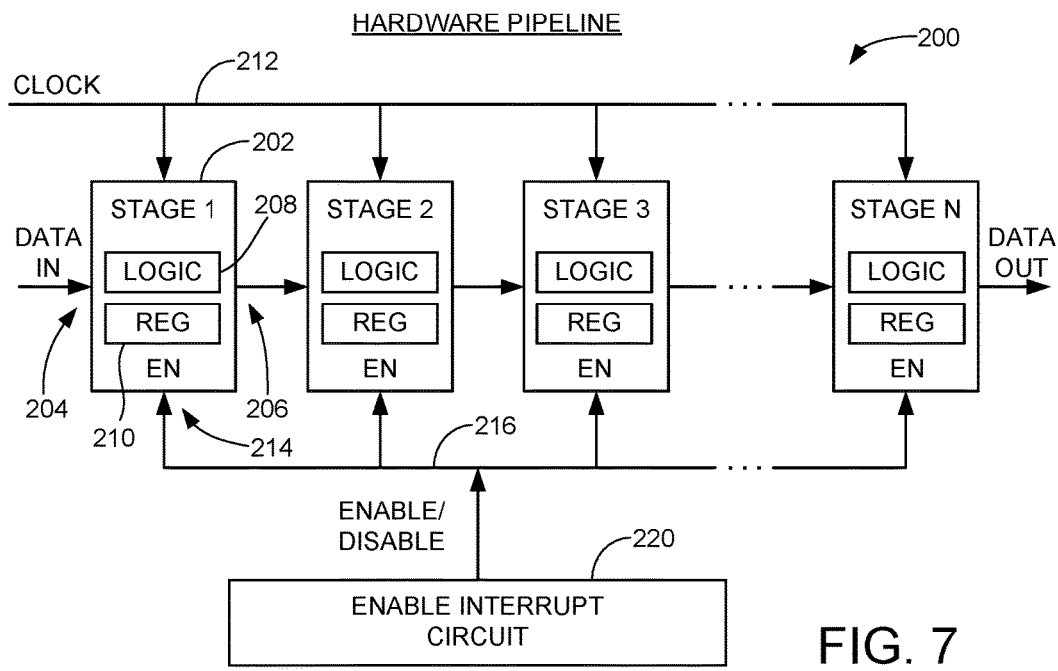
FIG. 7 is a functional block diagram of a cryptographic hardware pipeline circuit configured to carry out a selected cryptographic function in combination with an enable interrupt control circuit to defeat the DPA attack equipment of FIG. 5 in some embodiments.

FIG. 7 shows a cryptographic hardware pipeline circuit 200 ("pipeline") as a hardware based realization of the cryptographic algorithm block 130 in accordance with some embodiments. The pipeline 200 comprises a plurality of serially connected stages 202 from stage 1 to stage N. Each stage 202 has an input terminal 204 and an output terminal 206. The input terminal 204 of each successive stage is configured to receive the data output on the output terminal 206 of the immediately previous stage 204. In some cases, the output of the last stage (stage N) may be redirected as an input to the first stage (stage 1). As used herein, the term "hardware" refers to the circuit being a non-processor based circuit that does not utilize a programmable processor or other type device that executes programming stored in a memory in order to carry out the cryptographic function.

The configuration of each stage 202 will depend on the design of the underlying cryptographic function carried out by the pipeline. Other interconnections and data paths may be incorporated into the pipeline 200 as desired, so the generalized representation in FIG. 7 is merely exemplary and is not limiting.

Each stage 202 is shown to include a logic circuit 208 configured to carry out a combinatorial logic operation upon data stored in a register 210. A system clock signal is provided on control line 212 to clock the combinatorial logic operations and to advance the data through the pipeline over a processing time interval. The clock signal is supplied at a suitable frequency and continues to be applied to the stages during both processing and interrupted states of the stages.

Each stage is enabled via enable (EN) inputs supplied at enable terminals 214 via control line 216. It is contemplated that the stages are enabled high (e.g., operative when a logical 1, or high level, is supplied to the enable terminals), although other conventions can be used as desired.

An enable interrupt circuit 220 operates in conjunction with the pipeline 200 to selectively provide the enable/disable signals on control line 216 to the respective stages 202 during operation. The enable interrupt circuit 220 transitions the enable signal between an asserted state and a deasserted state to selectively interrupt the cryptographic processing by the pipeline 200. The stages 202 are operational when the enable signal is in the asserted state, and the stages are temporarily interrupted (non-operational) when the enable signal is in the deasserted state.

For reference, the term "processing interval" is used herein to describe a period of time during which the pipeline is operational (enabled). The term "interrupt interval" is used to describe a period of time during which the pipeline is non-operational (disabled). The application of the cryptographic function to a given input will involve both processing intervals and interrupt intervals in alternating succession. These intervals continue to be applied until the cryptographic function is completed.

Figure 8:
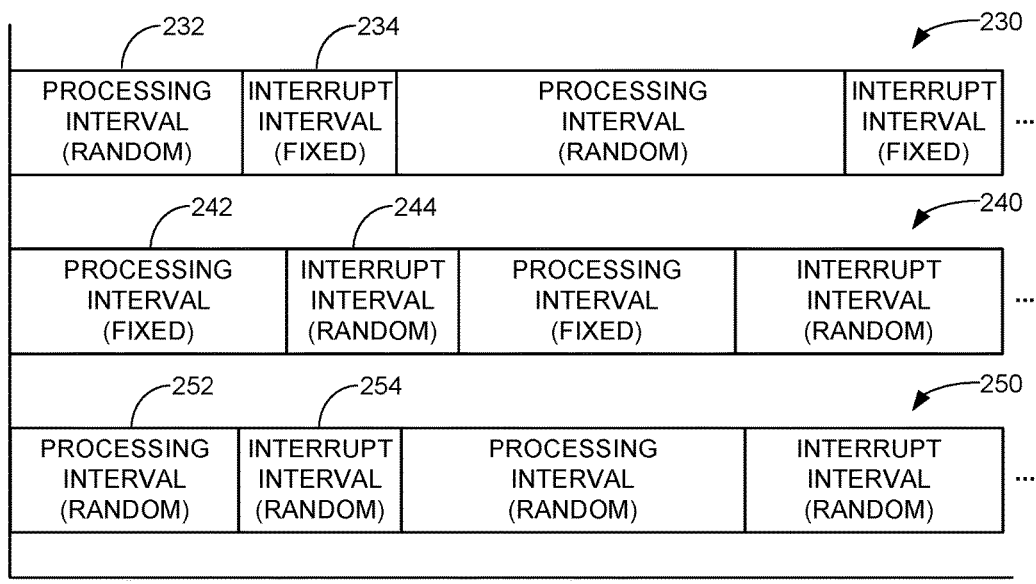
FIG. 8 is a timing diagram to show different modes of operation of the enable interrupt circuit in accordance with various embodiments.

The enable interrupt circuit 220 may be configured to operate in accordance with one or more operational modes. Three (3) available modes of operation are respectively represented in FIG. 8 at 230, 240 and 250. Each of the different modes in FIG. 8 provides a repeating sequence of processing intervals and interrupt intervals. The intervals may be measured in terms of selected numbers of clock cycles from a master clock. To enhance processing efficiency, the processing intervals may be, in total, significantly longer (more clock cycles) than the interrupt intervals (fewer clock cycles).

FIG. 8 shows the first mode 230 to use processing intervals 232 of random duration, followed by interrupt intervals 234 of fixed duration. The processing intervals 232 each have a randomly selected length corresponding to a sequence of random numbers. The interrupt intervals 234 each have the same length.

In some cases, the same fixed duration for the interrupt intervals 234 is applied each time the pipeline circuit 200 is used, so that the fixed duration is the same for each input value supplied to the pipeline. In other cases, the fixed duration for the interrupt intervals 234 may be changed to a different fixed value, either periodically or for each new input value provided to the pipeline. This different fixed values may be selected responsive to a second series of random numbers.

The second mode 240 involves the use of fixed duration processing intervals 242 and random duration interrupt intervals 244. In this case, the durations of the interrupt intervals 244 are selected responsive to a series of random numbers, and the durations of the processing intervals 242 are all the same value. As before, the fixed duration of the processing intervals 242 may be the same for all inputs to the pipeline circuit 200, or may be set to a different fixed value for different input values.

The third mode 250 involves the use of both random duration processing intervals 252 and random duration interrupt intervals 254. In this case, both intervals will have randomly selected durations during the cryptographic processing of a given input value. The respective durations of these intervals may be selected responsive to two different series of random numbers.

Figure 9:
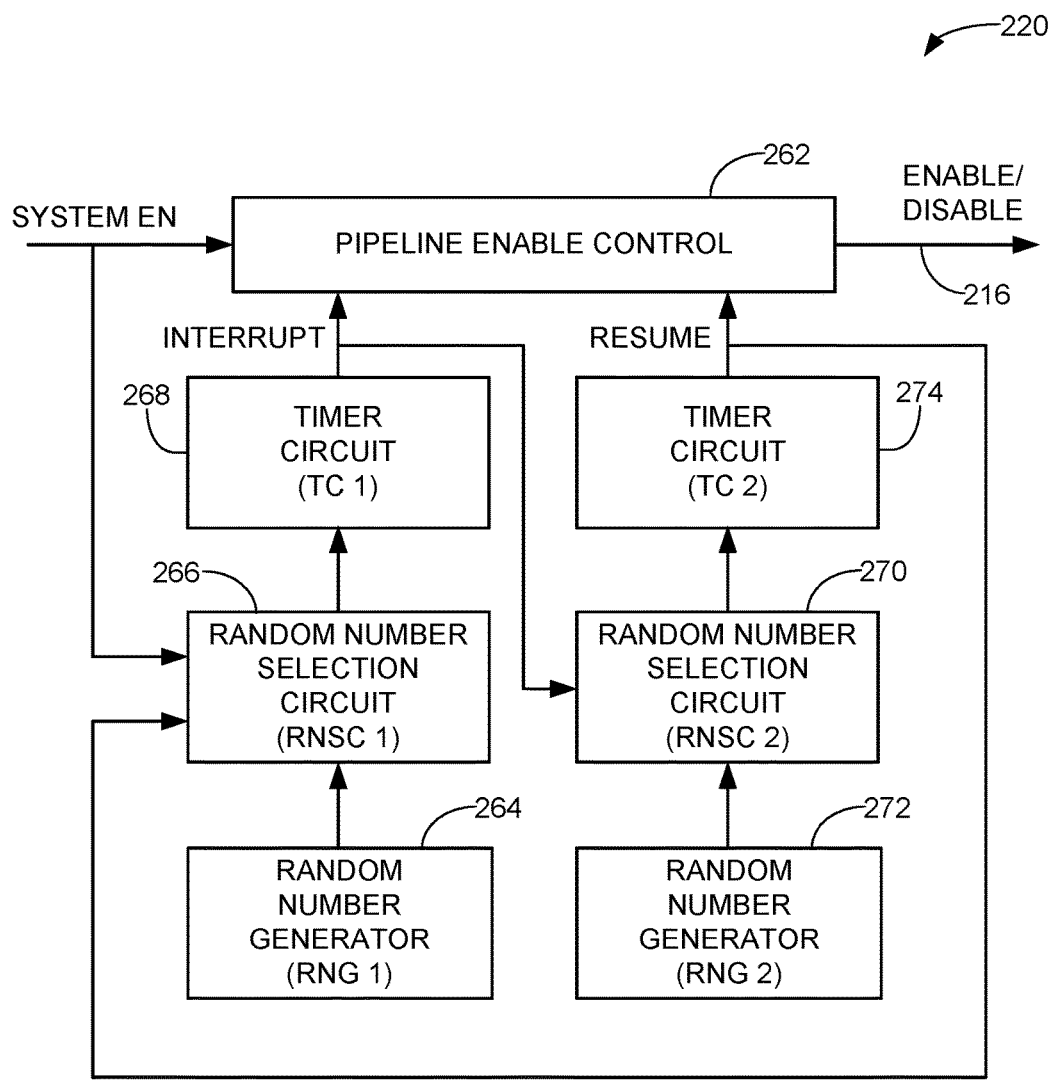
FIG. 9 shows the enable interrupt control circuit in greater detail.

FIG. 9 shows the enable interrupt circuit 220 of FIG. 7 in accordance with some embodiments. The following description will contemplate the third mode of operation is being employed by the circuit 220; that is, the circuit is operated to enact sequence 250 in FIG. 8 where both the processing intervals and the interrupt intervals have randomly selected durations. The skilled artisan can readily adjust the operation of the circuit 220 to carry out the other modes from FIG. 8 as desired (e.g., sequence 230 with random/fixed durations and sequence 240 with fixed/random durations).

A pipeline enable control circuit 262 outputs the enable/disable signal via path 216 to the stages 202 (see FIG. 7) in response to a system enable signal generated by a top level control circuit (e.g., SSD controller 112, etc.). The system enable signal is provided by the control circuit to enter a protection mode to protect against a side-channel attack. In some embodiments, a normal (non-protection or performance) mode can be available as well, in which case the stages 202 are continuously maintained in an enabled mode by the circuit 262 without the application of interrupt intervals during processing.

A first random number generator (RNG 1) 264 generates a first series of random numbers for use by the system. The RNG 1 circuit 264 can take a variety of forms, including a table of previously generated random numbers, an entropy source and entropy extraction circuit, a cryptographic function, a ring oscillator circuit, etc. Generally, the RNG 1 circuit 264 is configured to output random or pseudo-random numbers over a selected range that approach truly random numbers.

The random numbers are contemplated as comprising multi-bit random values which are in turn selected, as required, by a first random number selection circuit (RNSC 1) 266. It is contemplated that the RNSC 1 circuit 266 will select a different random number each time the circuit 266 operates. In some cases, predetermined scripts of random numbers may be selected, so long as sufficient entropy is present to not enable the protection, as described below, to be detected, predicted, compensated and defeated.

Each selected random number is loaded to a first timer circuit (TC 1) 268, which initiates a count to mark a selected time interval having a duration corresponding to the selected random number. In some cases, the TC 1 circuit 268 may be a countdown timer so that the multi-bit random number initializes the timer, which proceeds to count down to 0 or some other final value at a suitable clock rate. Other forms of timer circuit can be used, so long as the circuit initiates a variable elapsed amount of time corresponding to the input selected random number.

At the conclusion of the time interval, the TC 1 circuit 268 provides an input to the pipeline enable control circuit 262, which disables (interrupts) the enable signal by pulling it to a low value (e.g., logical 0). This temporarily halts further operation of each of the stages 202. The interrupt signal output by the TC 1 timer circuit 268 is also supplied to a second random number selection circuit (RNSC 2) 270 which selects a second random number from a second random generator (RNG 2) 272. Two separate sources of random numbers (e.g., RNG 1 and RNG 2) are represented in FIG. 7 to illustrate the separate random number channels, but a single random number generator circuit can be used to supply both series of random numbers as desired (e.g., RNG 1 and RNG 2 can be the same circuit/source).

The RNSC 2 circuit 270 initiates a second timer circuit (TC 2) 274 to initiate a second time interval responsive to the input random number from the RNSC 2 circuit. As before, the TC 2 circuit 274 may be a countdown timer that measures an elapsed period of time corresponding to the magnitude of the second input random number. Once this second interval of time is completed, a resume signal is output by the TC 2 circuit 274 to the pipeline enable control circuit 262, which reasserts the enable signal high and places the stages 202 back in an active state to continue the cryptographic function process.

The output resume signal is shown to be forwarded back to the RNSC 1 circuit 266 for selection of a new random number, and the foregoing process is repeated. In this way, the pipeline 200 is periodically interrupted at selected points in time in response to the first series of random numbers from RNG 1 264, and resumes operation at subsequent points in time responsive to the second series of random numbers from RNG 2 272. The periodic interrupts and returns sequence is continued a succession of times until the pipeline 200 has completed the processing of the associated data.

The random numbers selected from the first and second generators 264, 272 may be limited to first and second ranges to provide upper and lower bounds on the respective durations of the processing and interrupt intervals. To promote overall processing efficiency and reduce delays in the time required to complete the cryptographic processing, the first series of random numbers (which dictate the lengths of the processing intervals) may be significantly greater than the second series of random numbers (which dictate the lengths of the interrupt interval). In one embodiment, the first series of random numbers can be from A to B clock cycles where A and B are integers with A<B, the second series of random numbers can be from C to D clock cycles where C and D are integers with C<D, and D is significantly less than A (D<<A) such as by an order of magnitude or more.

With reference again to FIG. 9, implementing a fixed duration processing interval or a fixed duration interrupt interval can be carried out by repetitively loading the same fixed value to the respective timer circuit 268, 274 from a buffer or other suitable memory location. It follows that at least one of the processing or interrupt intervals, or both, will have a random duration selected responsive to one or more sequences of random numbers.

Figure 10:
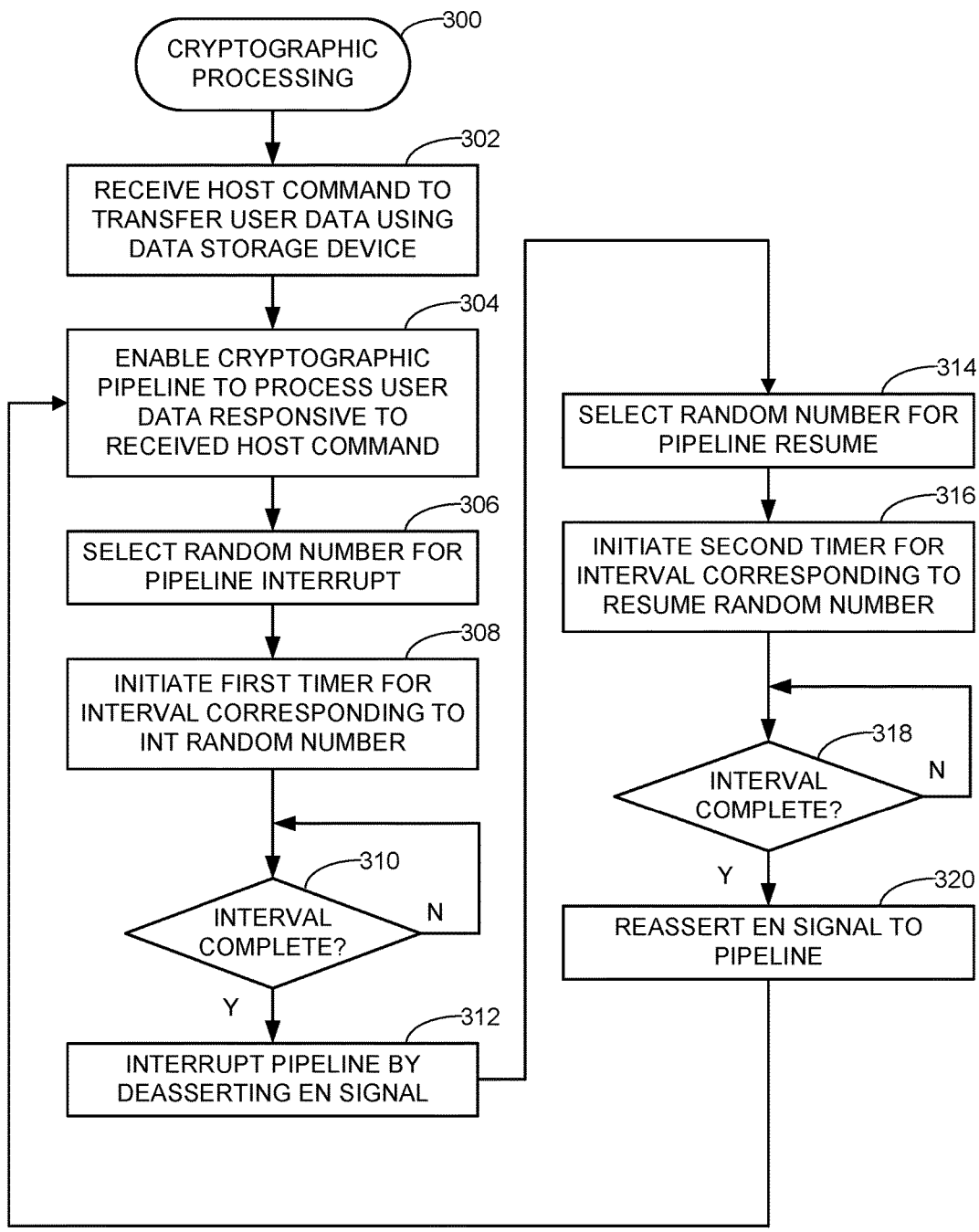
FIG. 10 is a flow chart for a cryptographic processing routine illustrative of steps carried out by various embodiments to protect against DPA attacks such as illustrated in FIGS. 5-6.

FIG. 10 shows a flow chart for a cryptographic processing routine 300 illustrative of the foregoing steps. As before, it is contemplated albeit not required that the various steps are carried out including by a cryptographic hardware pipeline circuit such as 200 in conjunction with a pipeline enable interrupt circuit such as 220. The various steps are merely exemplary and may be appended, modified, carried out in a different order, etc.

At step 302, a host command is received to transfer user data between the host device and the SSD 110. The host command may take the form of a write command in which input user data received from the host device are to be encrypted prior to storage in the NAND flash memory array 122. Alternatively, the host command may take the form of a read command in which previously stored and encrypted user data are subsequently retrieved, decrypted, and returned to the host device. Other forms of host commands may be received as well that initiate operation of the encryption/decryption functions of the SSD.

At step 304, the cryptographic pipeline circuit 200 is enabled to begin cryptographic processing of selected user data associated with the host command. It is contemplated that the full execution of the cryptographic function will take place over a relatively short period of time. Nevertheless, the remaining steps shown in FIG. 10 will be carried out multiple times prior to the conclusion of the execution of the cryptographic function.

A first random number is selected at step 306 for an interrupt (INT) timer, such as the TC1 circuit 268 of FIG. 9. The timer is initiated at step 268 to count out an elapsed time interval corresponding to the first random number. Decision step 310 indicates passage of this elapsed time interval.

At the conclusion of the elapsed time interval, the cryptographic function of step 304 is temporarily interrupted at step 312 by deasserting the pipeline enable signal. A second random number is selected at step 314 for a return call (RC) interval, which is initiated at step 316 and monitored by step 318. Once completed, the enable signal is reasserted at step 320 and the system resumes processing at step 304.

In this way, the routine 300 provides random duration processing and interrupt intervals. Fixed duration processing or interrupt intervals can be obtained by using a fixed value at respective steps 308 or 316.

Figure 11:
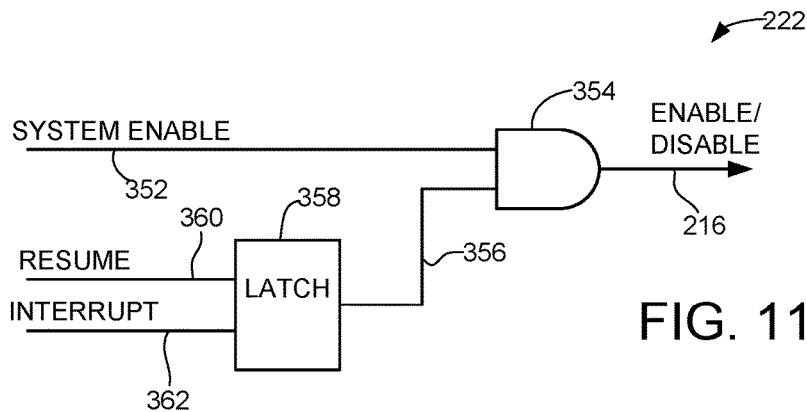
FIG. 11 is a logic diagram to illustrate aspects of the pipeline enable control circuit of FIG. 7 in some embodiments.

FIG. 11 shows a simplified logic diagram for the pipeline enable control circuit 262 of FIG. 9 in accordance with some embodiments. Other configurations may be used. The system enable signal supplied by the upstream control circuit to initiate pipeline operation is asserted high on signal path 352 and provided as the first input to a logic gate (in this case, an AND gate) 354. The second input to the AND gate 354 is supplied via path 356 as the output of a latch circuit 358.

The resume signal from the TC 2 timer circuit 274 is asserted high on signal path 360 as a positive input to the latch circuit 358. The interrupt signal from the TC 1 timer circuit 268 is asserted high on signal path 362 as a negative input to the latch circuit 358. In this way, the second input to the AND gate is initially high, goes low in response to the interrupt signal, and goes back high in response to the resume signal. When both inputs are high, the output of the AND gate is also high, and when one or both of the inputs are low, the output of the AND gate goes low.

Figure 12:
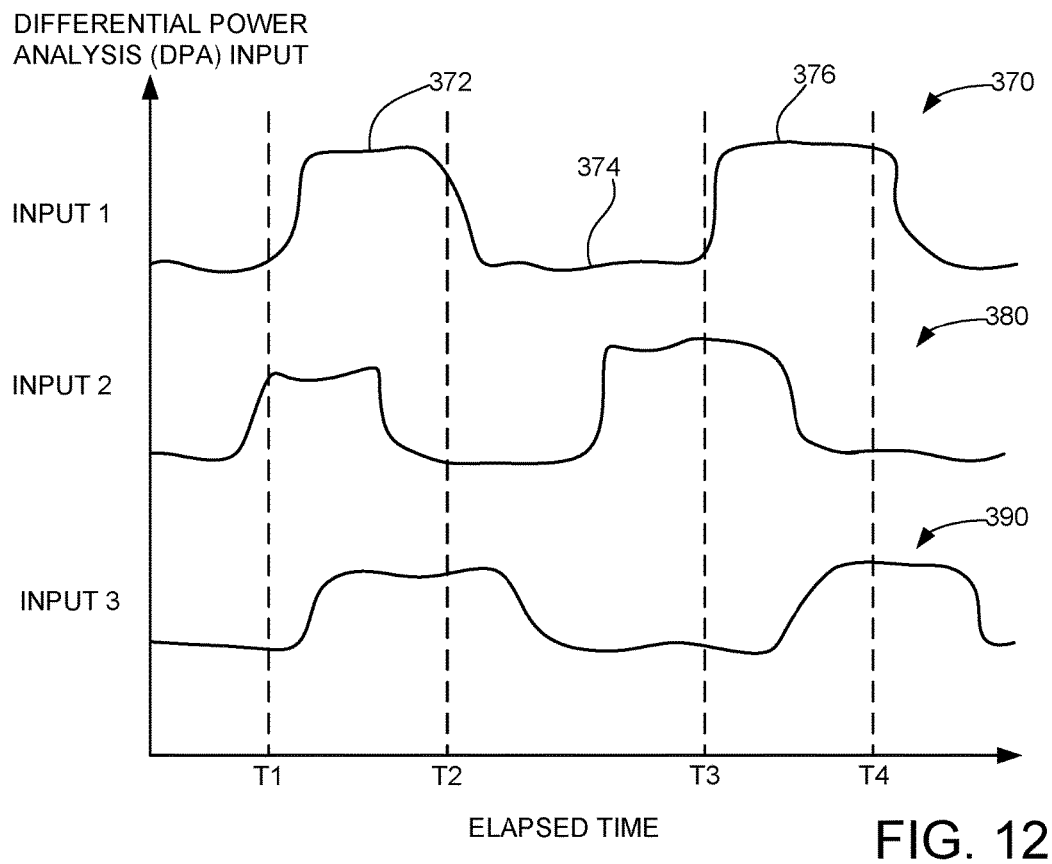
FIG. 12 is a graphical representation of exemplary data that may be recovered using the DPA attack equipment of FIG. 5 resulting from the cryptographic processing routine of FIG. 10.

FIG. 12 shows a corresponding sequence of DPA curves 370, 380 and 390 generally illustrative of DPA results that may be observed through the operation of the routine of FIG. 10. As before with the curves in FIG. 6, each curve includes pulses such as 372, 374 in curve 370 and troughs such as 376 in curve 370. The shapes and timing alignments are significantly different, however, as denoted by time indices T1-T4. These shifts in wave shape and timing reduce the ability of an attacking party from gleaning useful information in a side-channel attack.

While various embodiments have been directed to a data storage device such as an SSD, such is merely exemplary and is not limiting. The various embodiments can be readily adapted to substantially any processing device environment in which cryptographic processing is applied to reduce leakage of side-channel information in a communication channel.

As used herein, the term "random numbers" and the like will be understood consistent with the foregoing discussion to describe "true" random numbers, numbers that are essentially indistinguishable from true random numbers, and pseudo-random numbers.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
a cryptographic hardware pipeline circuit characterized as a non-processor based hardware circuit configured to perform a selected cryptographic function upon a selected set of data passed along a communication channel over a processing time interval, the cryptographic hardware pipeline circuit comprising a sequence of stages connected in series, each stage enabled responsive to an enable signal; and
an enable interrupt circuit configured to periodically interrupt the selected cryptographic function carried out by the cryptographic hardware pipeline circuit over the processing time interval by transitioning the enable signal from an asserted state to a deasserted state a first succession of times to provide a plurality of interrupt intervals and transitioning the enable signal from the deasserted state to the asserted state a second succession of times to provide a plurality of processing intervals interspersed with the interrupt intervals, at least a selected one of the processing intervals or the interrupt intervals having random durations selected responsive to a series of random numbers.

2. The apparatus of claim 1, wherein the enable interrupt circuit comprises at least one random number generator circuit configured to generate the series of random numbers, a first timer circuit configured to be initiated responsive to a first selected random number from the series of random numbers to denote a first elapsed time interval corresponding to the first selected random number, the first timer circuit further configured to output a timer complete signal at a conclusion of the first elapsed time interval, the enable interrupt circuit further comprising a pipeline enable control circuit configured to transition the enable signal between the asserted state and the deasserted state responsive to receipt of the timer complete signal from the first timer circuit.

3. The apparatus of claim 2, wherein the enable interrupt circuit further comprises a second timer circuit configured to be initiated responsive to a second selected random number from a second series of random numbers and the conclusion of the first elapsed time interval to denote a second elapsed time interval corresponding to the second selected random number, the second timer circuit further configured to output a second timer complete signal at a conclusion of the second elapsed time interval, the pipeline enable control circuit further configured to transition the enable signal between the asserted state and the deasserted state responsive to receipt of the second timer complete signal from the second timer circuit.

4. The apparatus of claim 1, wherein each transition from an immediately preceding processing interval to an immediately following interrupt interval is carried out responsive to a timer output signal from a timer circuit that is initialized to a first value, counts to a second value, and generates the timer output signal responsive to the timer circuit reaching the second value.

5. The apparatus of claim 4, wherein, for each said transition, the timer circuit is initialized to the same first value and counts to the same second value to provide a nominally constant elapsed count time.

6. The apparatus of claim 4, wherein, for each said transition, the timer circuit is initialized to a different first value or counts to a different second value to provide a different elapsed count time.

7. The apparatus of claim 1, wherein each of the processing intervals has a variable duration selected responsive to the series of random numbers, and each of the interrupt intervals has a fixed duration selected responsive to a fixed value.

8. The apparatus of claim 1, wherein each of the processing intervals has a fixed duration selected responsive to a fixed value, and each of the interrupt intervals has a variable duration selected responsive to the series of random numbers.

9. The apparatus of claim 1, wherein each of the processing intervals has a variable duration selected responsive to first series of random numbers, and each of the interrupt intervals has a variable duration selected responsive to a second series of random numbers.

10. The apparatus of claim 1, wherein the selected set of data comprises write data supplied from a host device for storage to a main memory of a data storage device, wherein the cryptographic function comprises encrypting the data using at least one encryption key to generate encrypted data, and wherein the apparatus further comprises a controller circuit configured to direct storage of the encrypted user data in a selected location of the main memory of the data storage device.

11. The apparatus of claim 1, wherein the selected set of data comprises read data retrieved from a main memory of a data storage device for transfer to a host device, wherein the read data comprises encrypted user data previously encrypted using a selected encryption key, wherein the cryptographic function comprises decrypting the encrypted user data using the selected encryption key to generate unencrypted user data, and wherein the apparatus further comprises a controller circuit configured to transfer the unencrypted user data to a buffer memory of the data storage device pending transfer, across a host interface, to the host device.

12. The apparatus of claim 1, wherein each stage in the cryptographic hardware pipeline circuit comprises a register to store data and a logic circuit configured to carry out a selected logic operation associated with the data storage in the register responsive to an input clock signal at a selected frequency, the clock signal applied both when the enable signal is asserted and when the enable signal is deasserted.

13. The apparatus of claim 1, further comprising a random number generator circuit configured to generate the series of random numbers, a timer circuit, and a random number selection circuit which selects at least one of the random numbers from the series of random numbers and initiates the timer circuit using the selected at least one of the random numbers from the series of random numbers.

14. A method of reducing leakage of side-channel information in a communication channel, comprising:
    initializing a cryptographic hardware pipeline circuit characterized as a non-processor based hardware circuit comprising a plurality of stages connected in series with an output terminal of each previous stage connected to an input terminal of each subsequent stage to perform a cryptographic function involving multiple logical computations to arrive at an output value responsive to an input value over a time interval from receipt of the input value by a first stage to generation of the output value by a last stage; and
    during the time interval, repetitively interrupting the cryptographic function by enabling each of the stages during a succession of processing intervals and disabling each of the stages during an intervening succession of interrupt intervals, at least a selected one of the processing intervals or the interrupt intervals having random durations selected responsive to a series of random numbers.

15. The method of claim 14, wherein each of the processing intervals has a variable duration selected responsive to the series of random numbers, and each of the interrupt intervals has a fixed duration selected responsive to a fixed value.

16. The method of claim 14, wherein each of the processing intervals has a fixed duration selected responsive to a fixed value, and each of the interrupt intervals has a variable duration selected responsive to the series of random numbers.

17. The method of claim 14, wherein each of the processing intervals has a variable duration selected responsive to first series of random numbers, and each of the interrupt intervals has a variable duration selected responsive to a second series of random numbers.

18. The method of claim 14, wherein each transition from an immediately preceding processing interval to an immediately following interrupt interval is carried out responsive to a timer output signal from a timer circuit that is initialized to a first value, counts to a second value, and generates the timer output signal responsive to the timer circuit reaching the second value.

19. The method of claim 18, wherein, for each said transition, the timer circuit is initialized to the same first value and counts to the same second value to provide a nominally constant elapsed count time.

20. The method of claim 18, wherein, for each said transition, the timer circuit is initialized to a different first value or counts to a different second value to provide a different elapsed count time.

* * * * *